United States Patent
Sivertsen

(10) Patent No.: US 7,260,624 B2
(45) Date of Patent: Aug. 21, 2007

(54) SYSTEMS AND METHODS FOR ESTABLISHING INTERACTION BETWEEN A LOCAL COMPUTER AND A REMOTE COMPUTER

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 10/247,876

(22) Filed: Sep. 20, 2002

(65) Prior Publication Data

US 2004/0059782 A1 Mar. 25, 2004

(51) Int. Cl.
*G06F 3/00* (2006.01)

(52) U.S. Cl. ............... 709/223; 709/203; 709/217; 715/740

(58) Field of Classification Search ........ 709/203–205, 709/217–219, 224, 208, 223; 700/19; 361/748, 361/752; 710/5, 40; 715/740, 750, 751, 715/753–756
See application file for complete search history.

(56) References Cited

U.S. PATENT DOCUMENTS

| | | | |
|---|---|---|---|
| 4,589,068 A | 5/1986 | Heinen, Jr. | 717/127 |
| 4,979,074 A | 12/1990 | Morley et al. | 361/720 |
| 5,228,039 A | 7/1993 | Knoke et al. | 714/28 |
| 5,455,933 A | 10/1995 | Schieve et al. | 714/27 |
| 5,491,743 A * | 2/1996 | Shiio et al. | 709/204 |
| 5,615,331 A | 3/1997 | Toorians et al. | 395/182.07 |
| 5,625,410 A | 4/1997 | Washino et al. | |
| 5,630,049 A | 5/1997 | Cardoza et al. | 714/25 |
| 5,732,212 A * | 3/1998 | Perholtz et al. | 709/224 |
| 5,777,874 A | 7/1998 | Flood et al. | 700/82 |
| 5,815,653 A | 9/1998 | You et al. | 714/38 |
| 5,819,093 A | 10/1998 | Davidson et al. | 717/126 |
| 5,850,562 A | 12/1998 | Crump et al. | 395/800 |
| 5,990,852 A * | 11/1999 | Szamrej | 345/2.1 |
| 6,054,676 A | 4/2000 | Wall et al. | 219/209 |
| 6,065,072 A | 5/2000 | Flath | 710/29 |
| 6,119,247 A | 9/2000 | House et al. | 714/38 |
| 6,137,455 A * | 10/2000 | Duo | 345/520 |
| 6,145,088 A | 11/2000 | Stevens | 714/2 |

(Continued)

OTHER PUBLICATIONS

Raritan Computer, Inc., "Raritan Announces New Paragon CIMs with Innovative DirectConnect Technology", a press release, Jan. 14, 2002. printed from www.raritan.com on Jan. 27, 2005.*

(Continued)

*Primary Examiner*—Saleh Najjar
*Assistant Examiner*—David Lazaro
(74) *Attorney, Agent, or Firm*—Hope Baldauff Hartman, LLC

(57) ABSTRACT

Methods and devices provide for remote management of a local computer by transferring screen frames produced by the local computer for viewing at a remote computer. The screen frame data may be obtained by digitizing an analog video output of the local computer and then grabbing frames from the digitized video, or by directly grabbing frames from a digital video output of the local computer. Additionally, interaction may be established with the local computer through user input devices such as a mouse and keyboard of the remote computer whose signals are transferred back to the local computer to alter the screen frames being produced by the local computer that are then transferred back to the remote computer for display.

33 Claims, 7 Drawing Sheets

U.S. PATENT DOCUMENTS

| | | | |
|---|---|---|---|
| 6,170,021 B1 | 1/2001 | Graf | 710/15 |
| 6,219,695 B1* | 4/2001 | Guttag et al. | 709/217 |
| 6,243,743 B1* | 6/2001 | Freeny | 709/217 |
| 6,272,562 B1 | 8/2001 | Scott et al. | 710/16 |
| 6,304,895 B1* | 10/2001 | Schneider et al. | 709/203 |
| 6,330,167 B1 | 12/2001 | Kobayashi | 361/818 |
| 6,360,250 B1 | 3/2002 | Anupam et al. | 709/204 |
| 6,377,461 B1 | 4/2002 | Ozmat et al. | 361/704 |
| 6,378,014 B1* | 4/2002 | Shirley | 710/100 |
| 6,397,256 B1* | 5/2002 | Chan et al. | 709/229 |
| 6,414,716 B1 | 7/2002 | Kawai | 348/211.3 |
| 6,434,003 B1 | 8/2002 | Roy et al. | 361/699 |
| 6,476,854 B1* | 11/2002 | Emerson et al. | 348/143 |
| 6,552,914 B1* | 4/2003 | Chang | 361/796 |
| 6,560,641 B1* | 5/2003 | Powderly et al. | 709/219 |
| 6,603,665 B1 | 8/2003 | Truong et al. | 361/752 |
| 6,609,034 B1* | 8/2003 | Behrens et al. | 700/19 |
| 6,636,929 B1* | 10/2003 | Frantz et al. | 710/313 |
| 6,651,190 B1 | 11/2003 | Worley et al. | 714/43 |
| 6,664,969 B1* | 12/2003 | Emerson et al. | 345/544 |
| 6,681,250 B1* | 1/2004 | Thomas et al. | 709/226 |
| 6,754,891 B1 | 6/2004 | Snyder et al. | 717/128 |
| 2001/0037366 A1* | 11/2001 | Webb et al. | 709/204 |
| 2002/0040418 A1 | 4/2002 | Bress et al. | 711/112 |
| 2002/0097234 A1 | 7/2002 | Sauber | 345/204 |
| 2002/0174415 A1 | 11/2002 | Hines | 717/127 |
| 2002/0194403 A1 | 12/2002 | Pua et al. | 710/62 |
| 2003/0035049 A1 | 2/2003 | Dickens et al. | 348/100 |
| 2003/0058248 A1 | 3/2003 | Hochmuth et al. | 345/537 |
| 2003/0110244 A1* | 6/2003 | Mondal | 709/223 |

OTHER PUBLICATIONS

"Z-Series information page" printout from Raritan website found at www.Raritan.com/products/kvm_switches/z_series/prd_line.aspx. Printed Feb. 10, 2006.*

U.S. Appl. No. 10/016,484, filed Dec. 10, 2001, entitled "Systems and Methods for Capturing Screen Displays From A Host Computing System for Display At A Remote Terminal." Inventor: Umasankar Mondal.

U.S. Official Action dated Aug. 13, 2003 in U.S. Appl. No. 10/016,484.

U.S. Official Action dated Mar. 8, 2004 in U.S. Appl. No. 10/016,484.

U.S. Appl. No. 10/790,160, filed Mar. 1, 2004, entitled "Method, Systems, and Apparatus for Communicating with a Computer Management Device." Inventor: Subash Kalbarga.

U.S. Appl. No. 10/867,348, filed Jun. 14, 2004, entitled "Housing for In-Line Video, Keyboard and Mouse Remote Management Unit." Inventor: Clas Gerhard Sivertsen.

U.S. Appl. No. 10/867,406, filed Jun. 14, 2004, entitled "In-Line Video, Keyboard and Mouse Remote Management Unit." Inventor: Clas Gerhard Sivertsen.

U.S. Official Action dated Jun. 22, 2004, in U.S. Appl. No. 10/016,484.

U.S. Notice of Allowance and Allowability dated Nov. 10, 2004 in U.S. Appl. No. 10/867,348.

U.S. Appl. No. 10/446,044, filed May 27, 2003, entitled "Method and System for Remote Software Debugging." Inventors: Subramonian Shankar and Jason Andrew Messer.

U.S. Appl. No. 10/926,241, filed Aug. 25, 2004, entitled "Apparatus, Methods, and Systems for Redirecting Input and Output for Multiple Computers." Inventor: Clas Gerhard Sivertsen.

U.S. Official Action dated Jan. 24, 2006 in U.S. Appl. No. 10/446,044.

U.S. Official Action dated Apr. 18, 2006 in U.S. Appl. No. 10/966,221.

"New KVM Switching System Control 2,048 Servers Using Cat5 Cable" printout from Raritan website found at http://www.raritan.com//about/abt_press_detail.aspx?&status=4&articlcld=127, printed May 24, 2006.

U.S. Official Action dated Sep. 5, 2006 in U.S. Appl. No. 10/966,221.

U.S. Official Action dated Oct. 5, 2006 in U.S. Appl. No. 10/446,044.

U.S. Official Action dated Feb. 27, 2007 in U.S. Appl. No. 10/867,406.

U.S. Appl. No. 10/966,221, filed Oct. 15, 2004, entitled "Systems and Methods for Capturing Screen Displays from a Host Computing System for Display at a Remote Terminal." Inventor: Umasankar Mondal.

U.S. Official Action dated Apr. 5, 2007, in U.S. Appl. No. 10/446,044.

* cited by examiner

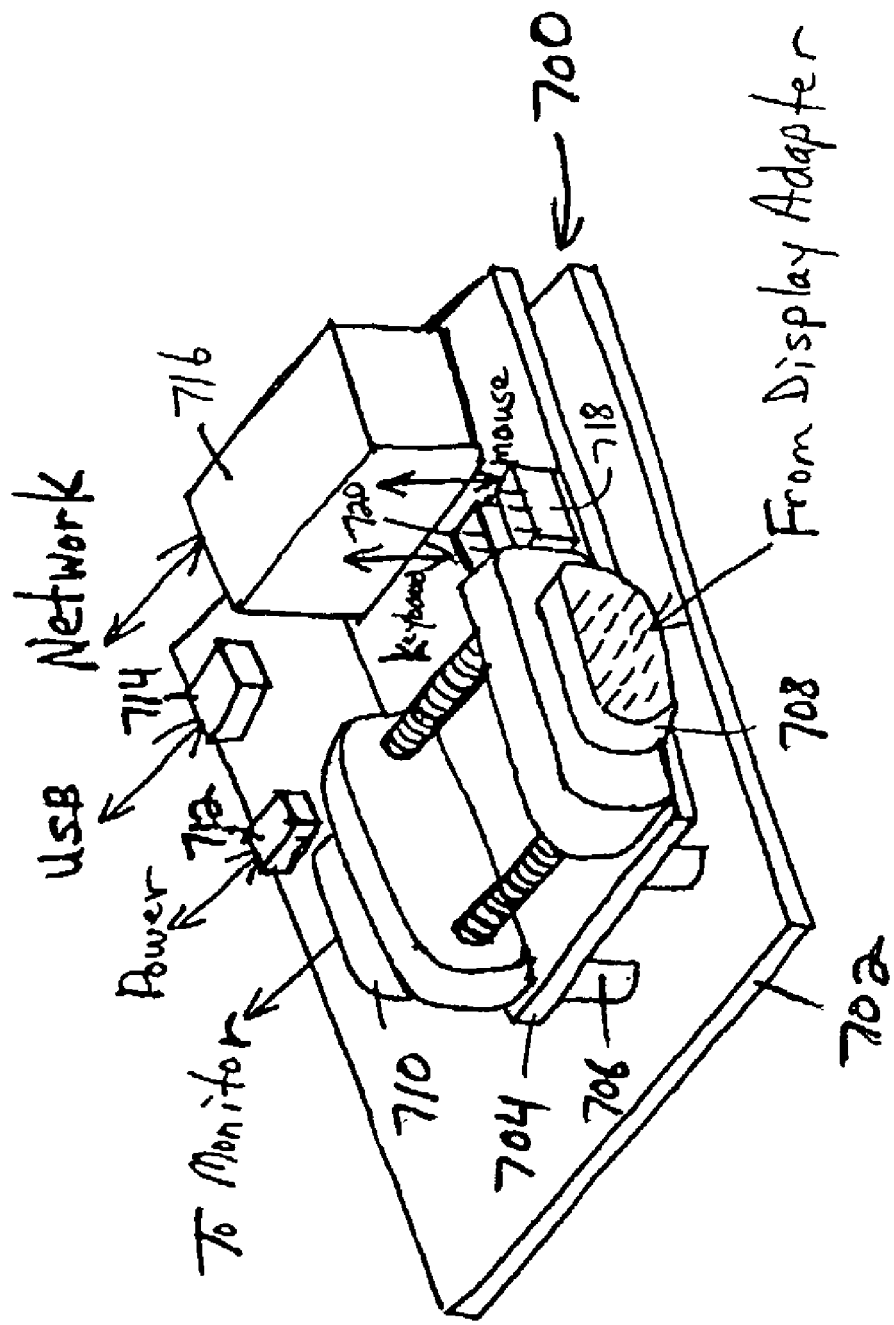

SYSTEMS AND METHODS FOR ESTABLISHING INTERACTION BETWEEN A LOCAL COMPUTER AND A REMOTE COMPUTER

TECHNICAL FIELD

The present invention relates to remote computer management. More particularly, the present invention relates to managing a local computer from another remotely located computer by providing screen displays of the local computer to the remotely located computer for display and providing user input from the remotely located computer to the local computer.

BACKGROUND

Computers are often linked together through networks to allow the resources of a computer at one location to be used by a computer and end user at another location. In a distributed environment, computers known as servers perform various tasks for client computers that communicate with the server over a network. The server enables sharing of files and other resources between client computers and the server, such as electronic mail. As an example, a world wide web ("web") server may provide resources to client computers over the Internet.

It is often necessary to manage activities of a computer or determine the relative health of a computer system by viewing screen display information and/or interacting with the computer through user input devices. This is especially true for servers whose resources are utilized by many individual client computers, such as within a corporate network or the Internet. For many conventional systems, the technician or other user who needs to view the screen displays and interact with the computer being managed is required to be physically located at the site of the computer. However, it is not always feasible for a technician or other user to be physically present.

For example, a system administrator of a corporate network is present at one location, but the computers of the corporate network may be spread around the globe. To effectively manage the computers of the corporate network, the system administrator must be able to effectively monitor many or all of the computers of the network contemporaneously. Because the system administrator cannot be physically present at each computer to be managed at the same time, effective management of the computers of the network becomes very difficult if not impossible. As a result, costly additional human resources are required to improve management of the computers.

Present solutions to providing remote management are a service under the operating system or a software application such as PC Anywhere. However, because these present solutions are software based the operating system must be operational with all services loaded to allow the remote monitoring to occur. Therefore, configuration and boot-up screens such as the bios are not made available to the remote location.

SUMMARY

Embodiments of the present invention address these problems and others by providing screen frames produced by a local computer to a remote computer for display and/or providing user input from the remote computer to the local computer. Thus, a user can view the screen information of the local computer anywhere a remote computer is located, without physically being present at the local computer. The screen frame data corresponding to the screen frames produced by the local computer is passed through a network, such as the Internet, to the remote computer where the remote computer produces a display that contains the screen frames being transferred. Additionally, certain embodiments of the present invention allow user activity at the remote device to be provided back to the local computer where the user activity can be implemented.

One embodiment is a method for establishing interaction between a local computer and a remote computer. The method involves receiving an analog video signal from the local computer and digitizing the analog video signal to produce a digitized video signal. A screen frame is grabbed from the digitized video signal to produce screen frame data. The screen frame data is transmitted to a remote computer for display.

Another embodiment is a method for providing interaction between a local computer and a remote computer. The method involves obtaining a digitized video signal having screen frames of the local computer and grabbing a frame from the digitized video signal to create screen frame data. The screen frame data is transmitted over a network to a remote computer. User input is received over the network from the remote computer in response to transmitting the screen frame data, and user input is also received from a user device for the local computer. Arbitration is then performed between the user input from over the network and the user input from the user device to provide user input to the local computer.

An embodiment of the present invention may be a device for establishing interaction between a local computer and a remote computer. The device includes a video input that receives analog video signals of the local computer and an analog-to-digital converter that digitizes the analog video signals to produce digitized video signals. A frame grabber grabs screen frames from the digitized video signals to create screen frame data. A network interface device is included, and at least one processing device is configured to provide the screen frame data to the network interface device for distribution across a network. The processing device establishes an IP address and provides the screen frame data upon receiving a request that is directed to the IP address through the network interface device.

Another embodiment of the present invention may be a device for establishing interaction between a local computer and a remote computer. The device includes a video input that receives video signals of the local computer and a frame grabber that grabs screen frames related to the video signals to create screen frame data. A network interface device is included, and at least one processing device is configured to provide the screen frame data to the network interface device for distribution across a network and receive user input data from the network. The processing device establishes an IP address and provides the screen frame data upon receiving a request that is directed to the IP address through the network interface device. A user device input is connected to at least one user device, and a user device output is in communication with the local computer. A controller is in communication with the at least one processing device and the user device input, and the controller is configured to arbitrate between user input from the network and user input from the at least one user device. The controller provides user device input through the user device output to the local computer.

DESCRIPTION OF THE DRAWINGS

FIG. 7 is a perspective view of a second device embodiment according to the present invention that is configured to be used externally of a local computer being remotely managed.

DETAILED DESCRIPTION

Local computers may be managed remotely through embodiments of the present invention so that the system manager or other user need not be physically present with the local computer but instead views screen displays and interacts with the local computer through a remotely located computer. For example, the user can remotely view screen frames being produced by the local computer to determine whether the local computer has crashed or whether the local computer is executing a particular application. Additionally, the end user may operate a user input device of the remote computer such as a mouse or keyboard, and the user input is transferred to the local computer where it can be implemented.

Figure 1:
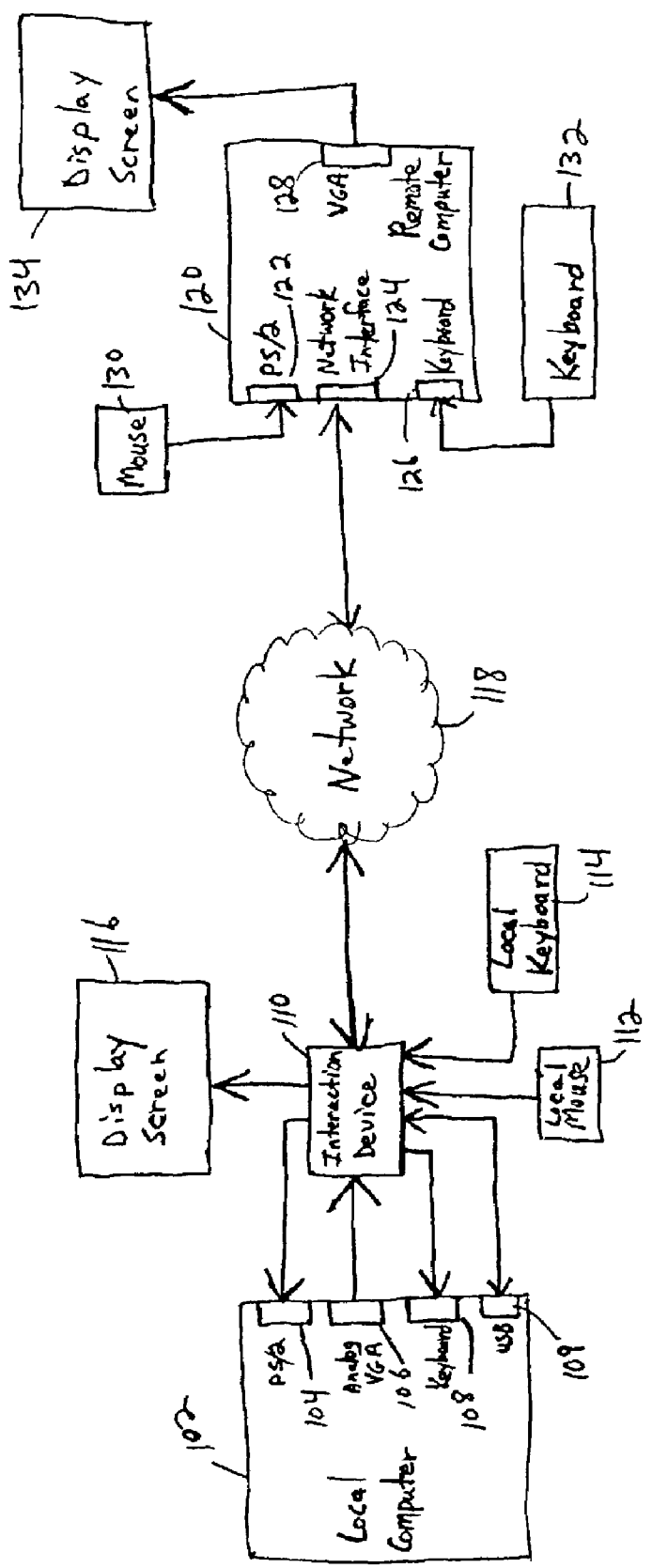
FIG. 1 illustrates a network operating environment for embodiments of the present invention that allow a remote computer to display screen frames of a local computer and provide user interaction with the screen frames.

An environment for application of embodiments of the present invention is shown in FIG. 1. The environment generally includes a local computer 102 that is to be remotely managed. An interaction device 110 is disposed between a network 118 and the local computer 102. A remote computer 120 is linked to the network 118, and the local computer 102 may or may not be linked to the same network 118 or another network not shown. The network 118 may be of various forms such as a local area network ("LAN") or wide area network ("WAN") including the Internet. A user is located at the remote computer 120 and remotely manages the local computer 102 via the network 118 and interaction device 110.

The interaction device 110 may be linked to the local computer 102 through several input/output ("I/O") connections of the local computer 102. Generally, a local computer 102 will have a video display output 106, such as an analog or digital VGA output. Also, the local computer 102 typically includes a PS/2 port or ordinary serial port configured as a mouse port 104, a keyboard port 108, and may also or alternatively include a universal serial bus ("USB") port 109.

The video display output 106 provides a signal that ordinarily is passed directly to a display screen or monitor 116 where screen frames are displayed for a user present at the local computer 102. However, in the embodiment shown, the video display output 106 provides a video signal to a video input of the interaction device 110. The interaction device 110 then passes the video signal through a video output to the display screen 116 where a normal video display of screen frames occurs. The details of the interaction device 110 and its operations upon the video signal are provided below with reference to FIGS. 2-4.

User input devices may also be provided for the local computer 102, including a local mouse 112 and local keyboard 114. Conventionally, the local mouse 112 and local keyboard 114 would be directly connected to the mouse port 104 and keyboard port 108 of the local computer 102. However, for the embodiment shown, the local mouse 112 and local keyboard 114 are connected to a mouse port and keyboard port, respectively, of the interaction device 110 and provide mouse and keyboard data to the interaction device 110 through these connections. The interaction device 110 then passes the mouse data and keyboard data to the respective ports of the local computer 102.

In addition to providing the pass-through of the video signal to the display screen 116, the interaction device 110 captures screen frame data from the video signal and transfers the screen frame data across the network 118 to the remote computer 120. The remote computer 120 has a network interface 124 linking the remote computer 120 to the network 118. The network interface 124 used by the remote computer 120 may be of various forms such as a dial-up modem or an Ethernet connection to a LAN. Various protocols of data transfer may be utilized between the interaction device 110 and the remote computer 120, such as the TCP/IP protocol ordinarily used via the Internet.

The remote computer 120 implements an application, such as a dedicated application or general purpose browser window such as a web browser, for receiving the screen frame data through the network interface 124 and providing a display on the display screen 134. The display includes the screen frame produced by the local computer 102 that corresponds to the screen frame data transferred by the interaction device 110. Typically, the remote computer 120 includes a video adapter that has a video output 128 connected to the display screen 134 to provide the video signals.

To allow the user of the remote computer 120 to fully interact with the local computer 102, user interface devices such as a mouse 130 and keyboard 132 are connected to a mouse port 122 and keyboard port 126, respectively, of the remote computer 120. The user manipulates the mouse 130 and keyboard 132 to interact with the screen frame shown on the display screen 134, which may be formed wholly or in part by the screen frame data received over the network 118. When the user activity at the remote computer 120 is entered with respect to the screen frame data received from the interaction device, then the processing device of the remote computer 120 transfers the user activity data over the network 118 to the interaction device 110 that passes it to the mouse port 104 and/or keyboard port 108.

Once the local computer 102 receives the user activity data through the mouse port 104 and/or keyboard port 108, the local computer 102 then implements the user activity as if it had occurred through the local mouse 112 or local keyboard 114. When implemented, the user activity alters the screen frame to be displayed. Therefore, the video signal output by the video connector 106 to the interaction device 110 provides the screen frames that show the change caused by the user activity at the remote computer 120, such as the mouse pointer moving or letters appearing in an electronic document.

The interaction device 110 transfers the screen frame data showing the user activity to the remote computer 120 where it is then provided to the display screen 134. Thus, the user activity initially performed at the remote computer 120 is represented on the display screen 134 immediately as it is being performed by the user and then once again after updating the video display of the local computer 102 and transferring the updated screen frame back to the remote computer 120.

As processing and propagation delays decrease within the environment 100, the initial and subsequent display of the same user activity (i.e., multiple cursors or mouse pointers) on the display screen 134 converge in time so that the user sees only one change. For example, moving a mouse pointer within the local computer screen frame shown on the display screen 134 may appear immediately as the user performs the activity and then later reappear such as a ghost movement once the screen frame update is received. However, as delays are reduced, for example by Giga-bit per second network transfer rates, the initial and subsequent mouse pointer movements converge to one movement as perceived by the user of the remote computer 120. Furthermore, as discussed below, the mouse over window option may be turned off for a browser window so that only a single mouse cursor is shown at all times, regardless of propagation delays.

In addition to receiving user input, the interaction device 110 may also provide for additional interaction with the remote computer 120 by providing a USB connection to a USB port 109 of the local computer 102. The USB connection allows the interaction device 110 to emulate USB devices for the local computer 102, such as additional storage devices including devices that the local computer 102 may use when booting-up. For example, the remote computer 120 may provide a floppy, CD-ROM, or hard disk drive that contains a boot-up sequence to be used by the local computer 102. Upon a connection being established over the network 118 between the interaction device 110 and remote computer 120, the local computer 102 may boot from a media source of the remote computer 120 with the boot-up sequence provided through the USB port 109.

The USB connection form the interaction device 110 may also allow a local keyboard and mouse and/or a keyboard and mouse of the remote computer to be emulated for the local computer 102. For example, the local computer 102 may have only USB ports instead of PS/2 ports and the interaction device 110 outputs mouse and keyboard signals to the local computer through the USB connection.

Figure 2:
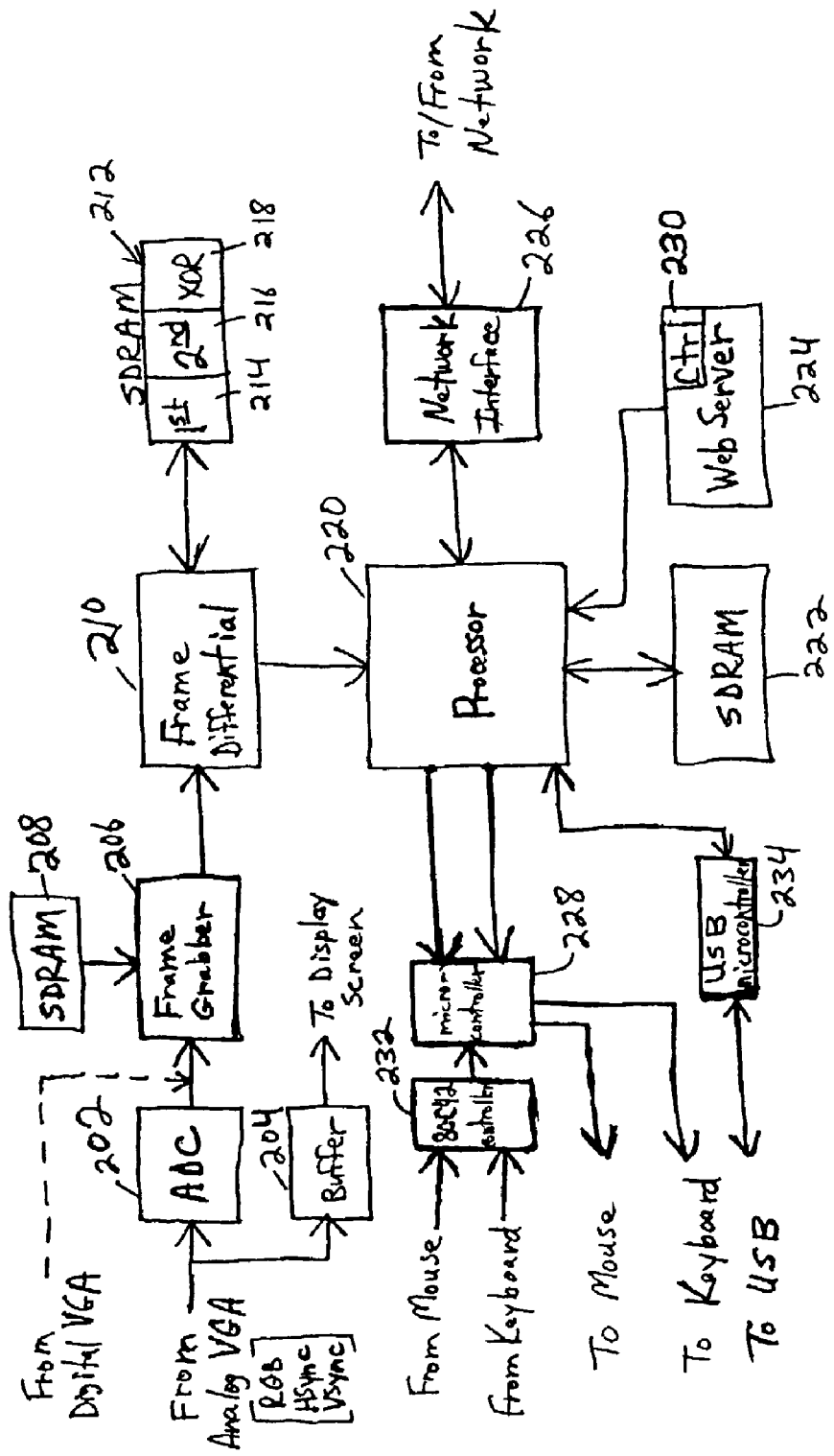
FIG. 2 shows the functional components of one embodiment of the present invention.

FIG. 2 shows the major components of one embodiment of the interaction device 110 of FIG. 1. This embodiment of the interaction device 110 includes an analog to digital converter 202 and a video buffer 204, and both of these receive the analog VGA video signal from the local computer 102. The analog VGA signal includes five distinct signals, including a red drive, a blue drive, a green drive, a horizontal synchronization pulse, and a vertical synchronization pulse. The video buffer 204 conditions the video signal through amplification and outputs it to the display screen 116 so that splitting the video signal between the converter 202 and the display screen 116 does not degrade the signal and the resulting display.

The converter 202 digitizes the video signal including the five distinct signals. The converter 202 then outputs the digitized video signal to a frame grabber 206. As one alternative, a digital video output of the local computer 102, if available, could be provided to the frame grabber 206 in place of the analog video signal that has been digitized as described above. The frame grabber 206 takes the portion of the digitized video signal corresponding to one screen frame and outputs that portion of the digitized signal as discrete screen frame data. The converter 202 and frame grabber 206 may be separate components or may be incorporated as one component. For example, an LCD controller may be used as a frame grabber 206 to capture the screen frame data.

The screen frame data is utilized by a frame differential component 210 to compute a difference between screen frame data of a current screen and a screen frame data of an immediately preceding screen frame. The frame differential component 210 maintains a previous screen frame data in a first memory location 214 in SDRAM 212 and maintains the current screen frame data in a second memory location 216. The frame differential component 210 then executes an exclusive OR ("XOR") Boolean operation upon the two sets of screen frame data to indicate where the changes have occurred between the two. The result of the XOR operation is stored in a third memory location 218.

The frame differential component 210 provides the screen frame data to a processing device 220 so that it may be transmitted. The screen frame data 210 may be either the entire screen frame data of the most current screen frame grabbed from the digitized video signal, or may be the screen frame data making up the difference detected by the XOR operation described above. Providing only the screen frame data representing the difference between the current screen frame and the preceding screen frame results in less data being distributed over the network 118.

Additional filtering functionality of the frame differential component 210 that is applicable when the analog video is digitized to reduce the amount of unnecessary data transfer may also be included, such as applying threshold comparisons to the most current screen frame data to determine whether to send the results of the XOR operation or send no new screen frame data. The threshold of this filtering component may be set as desired. As an example, the filter may look apply a 7 bit per pixel threshold to determine whether the screen frame data has had a significant change worth transmitting or only contains sampling noise where an analog to digital converter is used. When changes in the current screen frame data are significant as determined by the threshold, then the result of the XOR may be transmitted. The frame differential component 210 may be implemented in various ways, including a programmable logic device such as an field programmable gate array or application specific integrated circuit that is configured to implement the XOR operations and provide the result to the processing device 220.

The processing device 220 interacts with the frame differential component 210 to access the screen frame data to be provided to a network interface device 226. The processing device 220 may be implemented in various ways discussed above, such as but not limited to the PowerPC® 405GPr general purpose reduced instruction set processor manufactured by IBM® Corp. The processing device 220 employs logic to package the screen frame data for transfer by the network device 226 via a particular protocol, such as TCP/IP.

The screen frame data may be packaged for distribution by the processing device 220 from a network node established by the processing device 220 through the network interface 226. As one alternative, the processing device 220 in association with the network interface 226 may implement logic to behave as a web server 224 having a particular IP address for the network 118. The web server 224 provides the screen frame data as a resource that can be requested by a remote computer 120 through the network 118 by accessing the IP address of the web server 224 via a dedicated or generic browser window, such as a web browser like Internet Explorer by Microsoft®.

The screen frame data may be utilized by the browser window of the remote computer 120 in various ways. As an example, the browser window may be used to download the screen frame data in a continuous streaming manner and the screen frame data may be incorporated for display on the screen 134 by a dedicated application program of the remote computer 120. As another example, the browser window of the remote computer 120 may download the screen frame data in a continuous streaming manner for display of the screen frames on the screen 134 within the browser window itself such as where the browser window is a web browser. The browser window may implement browser commands of plug-in logic dedicated for a particular operating system platform such as an Active X® control to display the screen frames, or alternatively may implement a virtual machine that runs system independent browser commands such as a JAVA™ applet.

The processing device 220 interacts with SDRAM 222 to perform the processing operations including receiving the screen frame data and packaging the data for transfer by the network interface 226. Generally, the processing device 220 includes a media access control ("MAC"). The MAC packages the screen frame data and/or browser commands for physical layer transfer by the network interface 226. The network interface 226 may be of various forms such as a dial-up, digital subscriber line, ISDN, or cable modem or an Ethernet transceiver directly linked to a data network. The data is transferred from the transceiver of the network interface 226 via the network 118 to the appropriate IP address of the network interface 124 of the remote computer 120.

In addition to transferring the screen data to the remote computer 120 via the network 118, the network interface 226 also receives data transferred from the remote computer 120 over the network 118. The network interface 226 receives the request for screen frame data that occurs once the remote computer's browser has been directed to the IP address of the web server 224 of the interaction device 110. An example of a network interface 226 is a "phy" such as model LXT972A manufactured by Intel® Corp.

Additionally, the network interface 226 may receive data from the remote computer 120 that is indicative of the user activity occurring on the user interface devices of the remote computer 120. As discussed above, the end user may interact with the local computer screen frame being displayed on the screen 134 of the remote computer 120 by using the mouse and keyboard when the focus of the remote computer 120 is within the browser window display. The browser commands receive the user input of the user interface device and generate data corresponding to the user input relative to the local computer screen frame. The data is transmitted to the interaction device 110.

The interaction device 110 receives the data indicating the user activity through the network interface 226 where it is unpackaged from its transmitted state back to data that can be interpreted by the processing device 220. The processing device 220 receives the data describing the user activity that took place through the user interface devices of the remote computer 102. The processing device 220 then outputs a user interface command to a microcontroller 228 that arbitrates between the user input received over the network and the local user input received through a bus connection to an 80C42 compatible keyboard/mouse controller 232 that is coupled to the local mouse and keyboard. The microcontroller 228 may arbitrate by giving priority to one of the inputs where both the local and remote user input is received simultaneously to produce a clock and data output that is sent to the mouse or keyboard port of the local computer 102. In many instances, it may be appropriate to give the user input received over the network connection priority over local user inputs.

The local computer 102 implements the user activities transferred to the interaction device 110 over the network 118 as if they occurred through the user interface devices (i.e., mouse 112 and/or keyboard 114) directly coupled to the interface device 110. The user interface data provided as signals from the mouse or keyboard ports of the microcontroller 228 to the mouse port 104 or keyboard port 108 of the local computer 102 appear as ordinary mouse and keyboard data and clock signals.

To establish the USB connectivity discussed above between the interaction device 110 and the local computer 102, a USB microcontroller 234 may be included. The USB microcontroller 234 communicates with the processing device 220 to emulate a USB node for the local computer 102. Thus, a media source of the remote computer may be accessible by the local computer 102 by the USB microcontroller 234 emulating a USB media device for the local computer 102. Also, as discussed above, the USB microcontroller 234 may allow the emulation of a keyboard and mouse for the USB input of the local computer 102 to pass local and/or remote keyboard and mouse signals to the local computer 102.

Figure 3:
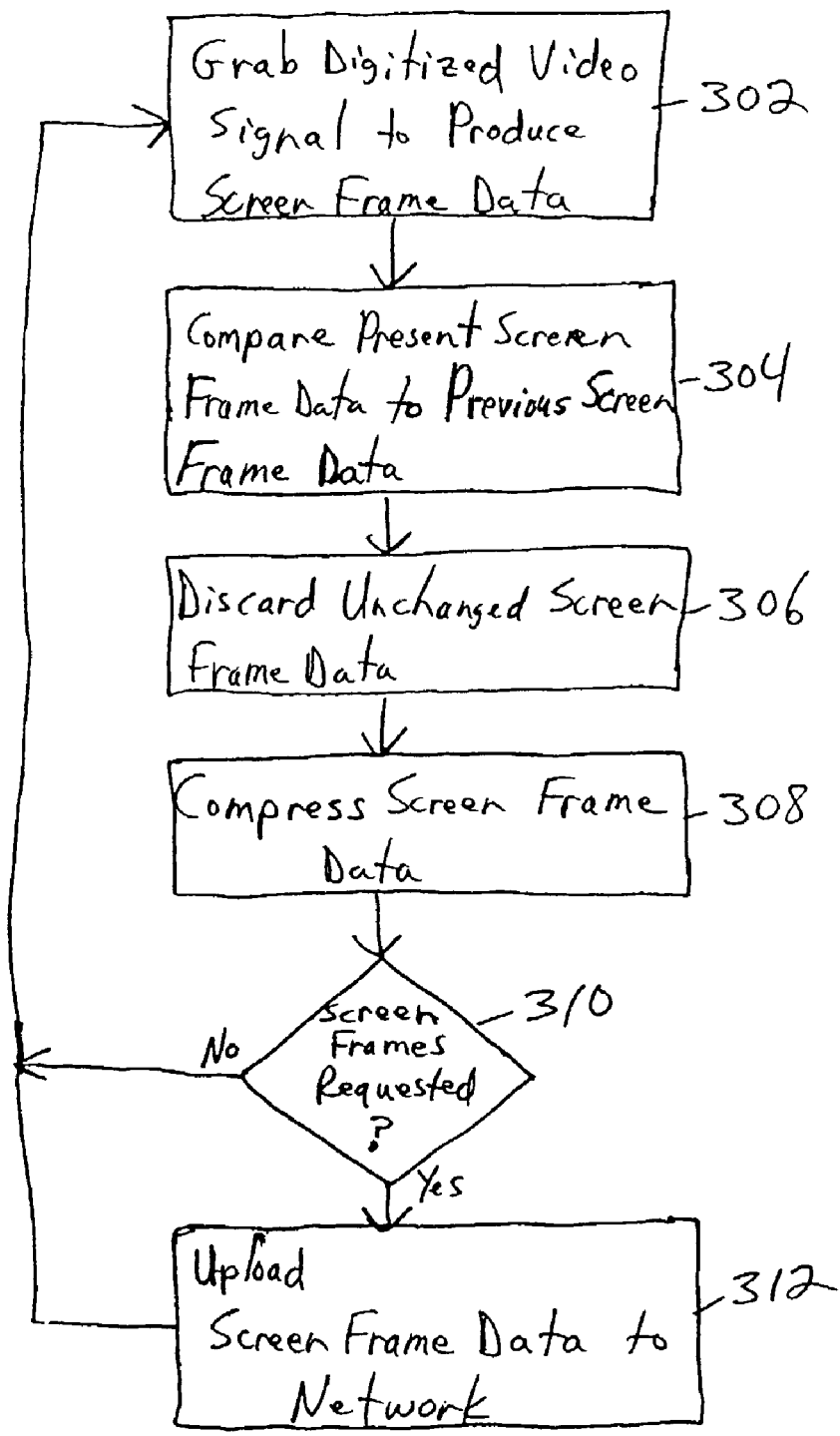
FIG. 3 depicts the logical operations of the embodiment of FIG. 2 for obtaining screen frames from a local computer that may then be transmitted to a remote computer for display.

FIG. 3 shows logical operations that may be performed by the components of the interaction device 110 to provide screen frames of the local computer 102 to the remote computer 120. The operations begin at frame operation 302 where the frame grabber 206 grabs a screen frame for the digitized video signal. As mentioned above, the digitized video signal may be produced by an analog to digital converter or may be taken directly from a digital video output of the local computer 102 if available.

Once a screen frame has been obtained, the difference between the current screen frame data and the previous screen frame data is found through the filtering and/or XOR function as discussed above at comparison operation 304. The unchanged screen frame data can be discarded since it has already been transferred over the network 118 for the previous screen frame. As discussed above, an alternative to detecting the changes from one screen frame to the next is to always transfer the entire screen frame data rather than only the changes, but additional network bandwidth will be utilized by the larger data transfers. Also, as discussed above, rather than always sending the result of the XOR function, a threshold filter may be applied first to determine whether the current screen frame data has a significant change (e.g., greater than 7 bits of variation for a pixel value) to decide to send no screen frame data when the change is less than the threshold or to send the result of the XOR between the first and second screen frame data sets when the change is greater than the threshold.

After the screen frame data that is to be transferred has been obtained, the screen frame data may be compressed at compression operation 308. The screen frame data may be compressed through any one of various compression schemes to further reduce the amount of data to be transferred. The compression scheme may be programmed into either the frame differential component 210 or the processing device 220. Alternatively, the screen frame data may be transferred without being compressed, but additional network bandwidth will be utilized due to larger data transfers.

Query operation 310 of the web server 224 detects whether screen frames have been requested by an attempt to access the IP address of the web server 224 for the network 118. Once screen frame data has been requested, the current screen frame data that has been obtained and compressed is uploaded from the web server 224 over the network 118 at upload operation 312. The data is directed to the IP address of the remote computer 120 that addressed the web server 224. Additionally at upload operation 312, the control information 230 including browser commands such as a JAVA™ applet or Active X control may be transferred from the web server 224.

Figure 4:
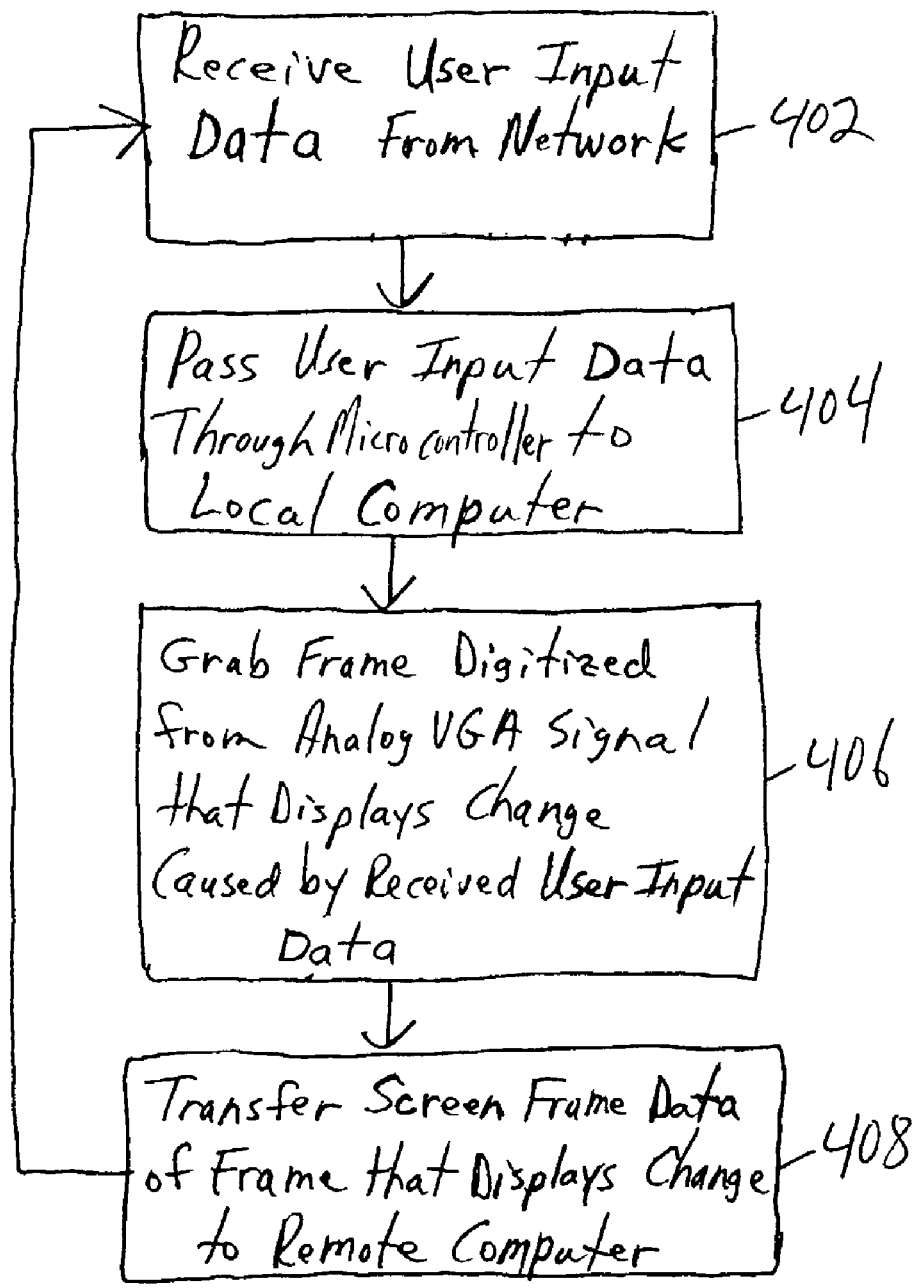
FIG. 4 shows the logical operations of the embodiment of FIG. 2 for allowing user activity occurring at the remote computer to be implemented at the local computer.

FIG. 4 shows the logical operations performed by the interaction device 110 to provide a user of the remote computer 102 the ability to interact with the local computer 102. The processing device 220 receives the user input data from the network 118 at input operation 402. The user input data is generally produced by the browser commands as a result of the user manipulating the mouse 130 or keyboard 132 in relation to the screen frame being displayed within the browser. As discussed above, the browser commands that detect the user input and produce the user input data may be a plug-in to the browser window or may be an applet that is distributed to the browser when screen frame data is initially requested.

Upon receiving the user input data from the network 118, the processing device 220 instructs the microcontroller 228 to provide mouse or keyboard data signals corresponding to the user input data to the local computer 102 at controller operation 404. Thus, the processing device 220 formulates an instruction to the microcontroller 228 to move the mouse pointer, perform a mouse click, or to enter keyboard entries as appropriate at the local computer 102.

During this time, the interaction device 110 continues to grab screen frames and transfer them to the remote computer 120. During and after implementing the mouse and keyboard activity received through the network 118, screen frames are obtained at frame operation 406 that display the change that has been implemented due to the user activity at the remote computer 120. For example, if the user activity is mouse pointer movement, then the succession of captured screen frames show the movement of the mouse pointer.

At transfer operation 408, the screen frame data that which shows the user activity is transferred from the interaction device 110 to the remote computer 120. The remote computer 120 then updates the screen frame being displayed within the browser window. As previously discussed, this loop may result in artifacts such as multiple mouse pointers on the screen frame but as propagation and processing delays decrease, the immediate and delayed changes to the screen frame converge in time so that the artifacts are no longer perceivable. Also, the mouse over window option may be turned off at the remote computer for the browser window displaying the screen frames.

The process of updating the screen frame, receiving additional user input, transferring the user input for implementation by the local computer 102, and again updating the screen frame continues until the remote computer 120 no longer accesses the interaction device 110. This continuous loop allows the user of the remote computer 120 to interact with and manage the local computer 102.

Figure 5:
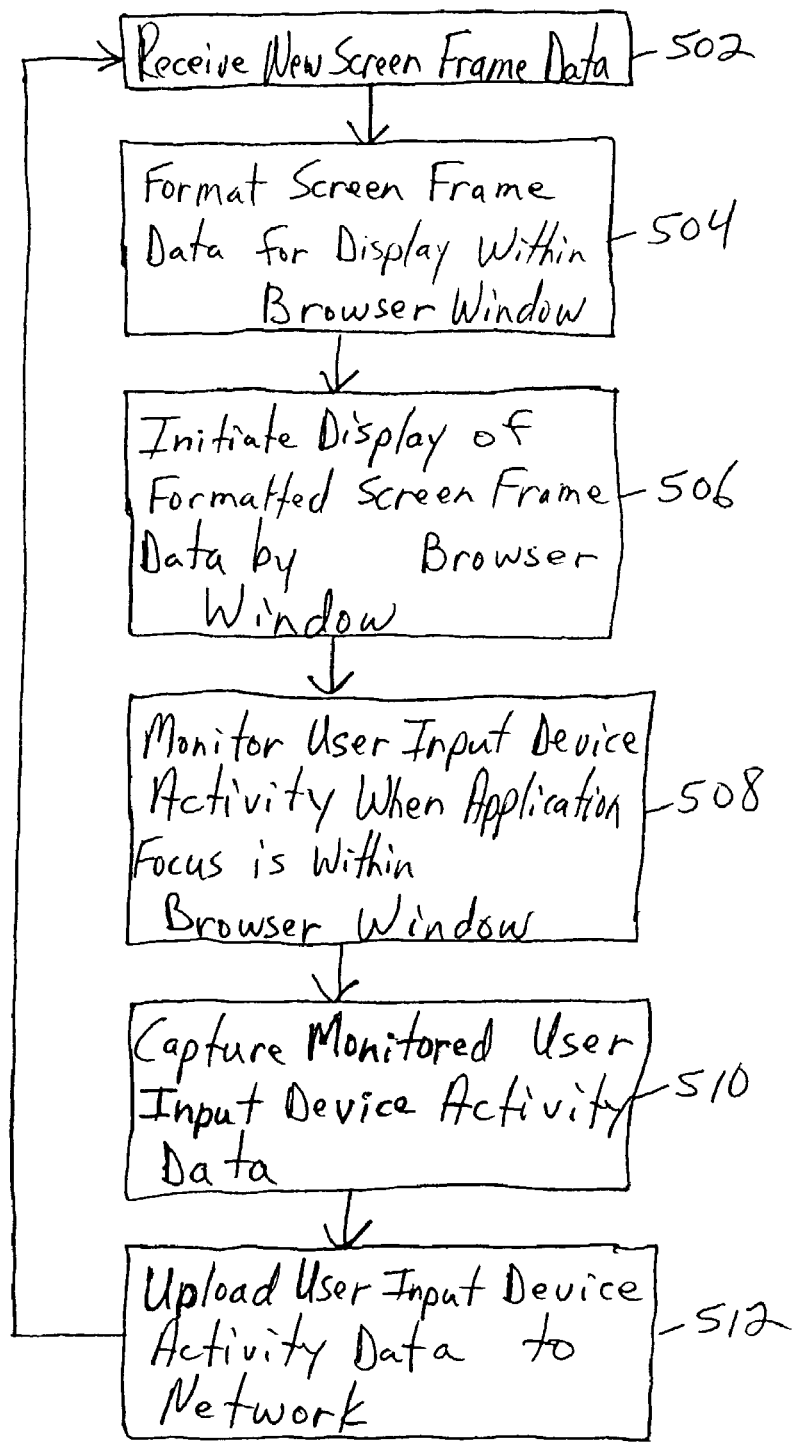
FIG. 5 illustrates the logical operations occurring at the remote computer for allowing screen frames of the local computer to be displayed at the remote computer.

Illustrative logical operations performed by the remote computer 120 to receive and display the screen frames of the local computer 102 are shown in FIG. 5. The remote computer 120 receives the most current screen frame data from the network 118 at receive operation 502. The remote computer 120 receives the screen frame data through the network interface 124 which provides the data to a processor that implements a dedicated application or browser window for displaying the screen frame.

The processor implementing the browser window formats the screen frame data for display within the browser window at format operation 504 by execution of the browser commands discussed above. Formatting the data involves either adapting the screen frame data for full screen display at the resolution provided by the remote computer 120 or for display within a GUI window on the display screen 134 with corresponding scroll bars for the window if necessary. The processor of the remote computer 120 then initiates display of the formatted screen frame data by the browser window at display operation 506.

The browser window implementing the browser commands then monitors for user activity within the screen frames being displayed by the browser window at monitor operation 508 whenever the browser window is the active focus of the GUI. When activity is detected, the browser commands cause user activity to be recorded at capture operation 510. Recording the user activity involves recording the mouse pointer movement and mouse clicks along with the relative coordinates of the mouse pointer within the screen frame. For example, if the mouse pointer is positioned at a particular location on the screen frame and is moving in a particular direction, the recorded user activity data includes both the location of the pointer relative to the coordinates defining the screen frame and the movement characteristics such as speed and direction. Additionally, recording the user activity involves recording the position of the cursor within the screen frame and any typing that occurs for the cursor position.

The browser commands then continually upload the user input data to the IP address of the web server 224 at upload operation 512. As discussed in relation to FIG. 4, the interaction device 110 receives the user input data and provides mouse and keyboard signals to the local computer 102 so that the user inputs received at the remote computer 120 can be implemented by the local computer 102. The updated screen frames of the local computer 102 are then captured and transferred to the remote computer 120 for display so that the user can see that the user input has been implemented.

Figure 6:
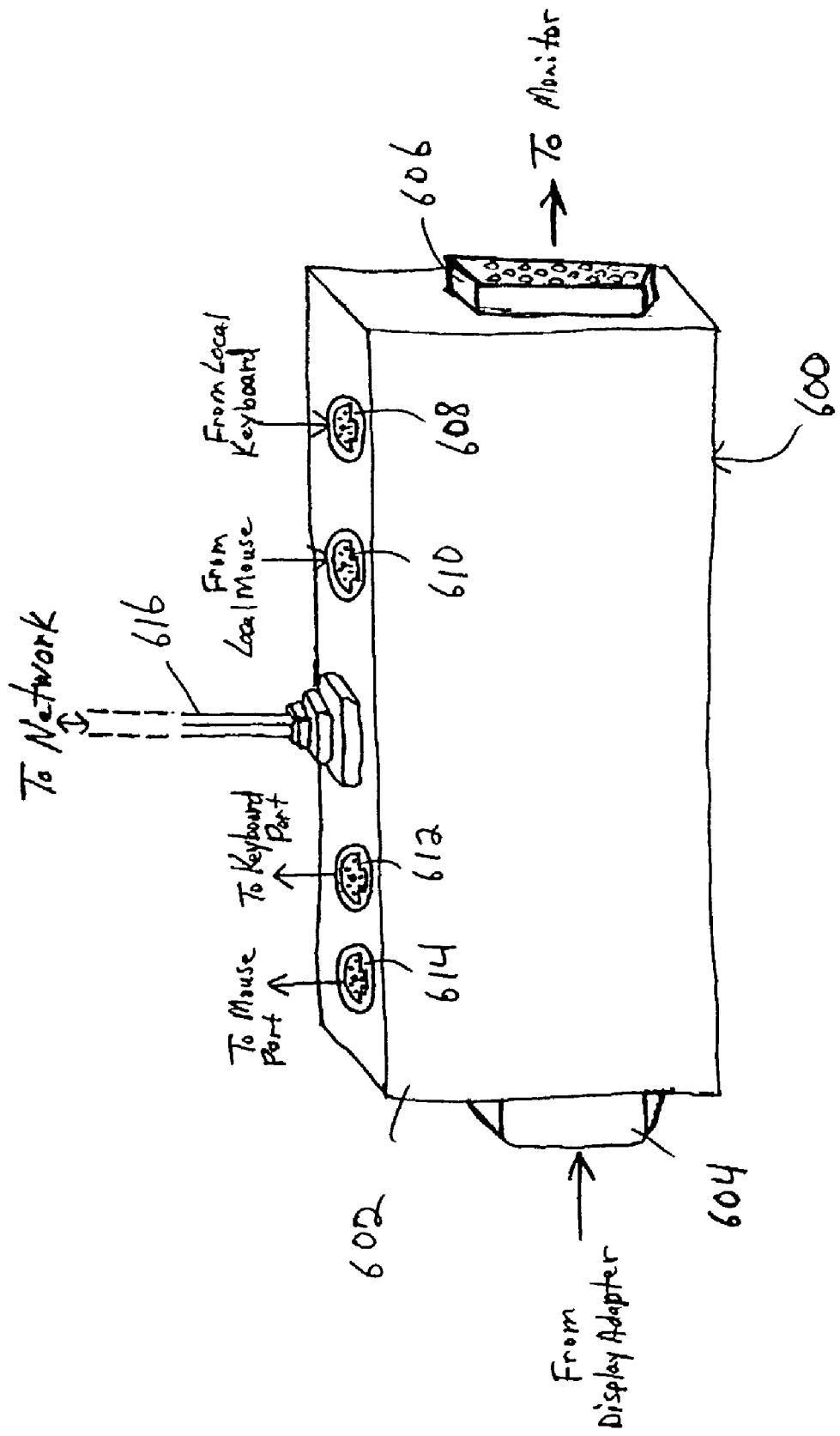
FIG. 6 is a perspective view of a device embodiment according to the present invention that is configured to be used externally of a local computer being remotely managed.

FIG. 6 shows a perspective view of an external implementation 600 of the interaction device 110. The external interaction device 600 includes an outer case 602 that provides several ports. A video input connector 604 is included for connection to a cable that is also connected to the external video connection of the local computer 102. The video input connector 604 receives the analog video output from the local computer 102 and passes the signal that is split between the analog to digital converter 202 and the video buffer 204. The output from the video buffer 204 is provided to a video output connector 606 that is connected to a cable of the display monitor 116 and enables the display monitor 116 to show the screen frames produced by the local computer 102.

The external interaction device 600 also includes a mouse input port 610 and keyboard input port 608 that are connected to the local mouse 112 and local keyboard 114, respectively. These ports 610, 612 channel signals to the switch 228 which then passes the signals to a mouse output port 614 and keyboard output port 612, respectively. The mouse output port 614 and keyboard output port 612 are connected to the mouse port 104 and keyboard port 108, respectively, of the local computer 102. These input and output ports for the mouse and keyboard may be PS/2 style ports, standard keyboard ports, standard serial ports, or other connection types known for a keyboard and mouse.

The external interaction device 600 also includes a network connection 616, such as a hardwired twisted pair cable for a direct network connection or a jack for receiving a cable. The network connection 616 links the external interaction device 600 to the network 118 and provides a bi-directional communication path for sending and receiving data, as discussed above.

Various power sources may be included for the device 600. On-board batteries and/or a wall adapter may be utilized to provide the DC voltage required by the circuitry described above. Furthermore, the device 600 may draw power from various connections made to the local computer 102, such as through the mouse or keyboard ports.

The external interaction device 600 allows the device 600 to be easily added to a local computer 102. Because all connections to the local computer 102 are external, the device 600 can be quickly and easily installed or removed. However, it should be appreciated that the interaction device 110 may be of various forms, including internal implementations where the device 110 is located inside the local computer 102 and one or more of the connections to the local computer 102 are made internally.

FIG. 7 shows a perspective view of another physical embodiment 700 of the interaction device 110. This interactive device 700 has a condensed form that allows a video input connector 708 of the device 700 to be plugged directly into the video card of the local computer 102 without requiring a cumbersome video cable. The condensed form reduces the weight that would otherwise tend to unplug the device 110 from the video port of the local computer 102 when directly connected without a cable.

The device 700 includes a first printed circuit board 702 that provides a mounting surface for the logic devices such as the microcontroller 228, processor 220, SDRAM 208, 212, and 222, USB microcontroller 234, universal device controller 232, converter 202, and frame grabber 206, frame differentiator 210, and network interface chipset 226. The first printed circuit board 702 may also include a power jack 712 for connection to an external wall adapter and a USB port 714 for connection to a USB cable that connects to the USB port of the local computer 102.

To condense the form, a second printed circuit board 704 is suspended above the first board 702 by spacers 706. The board 704 supports various connectors such as the video input connector 708, video output connector 710, mouse connector 718, keyboard connector 720, and network connector 716. The connectors of the second printed circuit board 704 are electrically connected to the circuitry of the first printed circuit board 702 through patch wires (not shown) such as a flex tab circuit.

To further condense the form of the device 700, the mouse connector 718 and keyboard connector 720 may have a sufficient number of conductor pins to provide both an input connection for the local mouse and keyboard and an output connection for providing signals to the local computer 102. Thus, the cable(s) that plugs into the mouse connector includes wires that pass signals from the mouse to the connector 718 and also includes wires that pass signals from the mouse connector 718 to the mouse port of the local computer 102. Likewise, the cable(s) connected to the keyboard connector 720 also provide wires that pass signals between the keyboard and connector 720 and wires that pass signals between the connector 720 and the keyboard port of the local computer 102.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for establishing interaction between a local computer and a remote computer, comprising:

receiving a video signal from the local computer through a video input of a device directly interfaced to an external video output port of the local computer such that the device is externally and rigidly connected to the local computer without the use of an external video cable for transferring video signals between the local computer and the device;

grabbing a screen frame from the video signal to produce screen frame data;

transmitting the video signal from the local computer to a video output configured for connection to a local display device;

transmitting the screen frame data to a remote computer for display, wherein transmitting the screen frame data to the remote computer comprises providing a web server with an Internet Protocol (IP) address that the screen frame data is accessed from upon receiving a request that is directed to the web server at the IP address;

receiving a first user input from over a network;

receiving a second user input from a user device for the local computer;

if the first and second user inputs are received in succession, providing each user input to the local computer when received;

if the first and second user inputs are received simultaneously, assigning user input priority to one of the first or second user inputs; and providing user input to the local computer according to the assigned priority.

2. The method of claim 1, further comprising compressing the screen frame data obtained from the video signal prior to transmitting the screen frame data.

3. The method of claim 1, further comprising comparing a first set of screen frame data previously transmitted to the remote computer to a second set of screen frame data and transmitting only the screen frame data taken from the second set of screen frame that is different than the first set of screen frame data.

4. A method for providing interaction between a local computer and a remote computer, comprising:

obtaining a digitized video signal having screen frames of the local computer via a video input of a device directly interfaced to an external video output port of the local computer such that the device is externally and rigidly connected to the local computer without the use of an external video cable for transferring video signals between the local computer and the device;

grabbing a frame from the digitized video signal to create screen frame data;

transmitting the digitized video signal to a video output configured for connection to a local display device;

transmitting the screen frame data over a network to a remote computer, wherein transmitting the screen frame data over a network to a remote computer comprises providing a web server with an Internet Protocol (IP) address that the screen frame data is provided from upon receiving a recluest that is directed to the web server at the IP address;

receiving a first user input over the network from the remote computer in response to transmitting the screen frame data;

receiving a second user input from a user device for the local computer; and if the first and second user inputs are received one after the other, providing each user input to the local computer when received; and if the first and second user inputs are received simultaneously, assigning user input priority to one of the first or second user inputs; and providing user input to the local computer according to the assigned priority.

5. The method of claim 4, further comprising compressing the screen frame data prior to transmission.

6. The method of claim 4, wherein upon receiving the user input at the local computer, the method further comprises:

grabbing a new screen frame from the digitized video signal produced by the local computer that incorporates changes resulting from the user input received from the remote computer to produce new screen frame data; and transmitting the new screen frame data to the remote computer.

7. The method of claim 4, further comprising comparing a first set of screen frame data previously transmitted to the remote computer to a second set of screen frame data and transmitting screen frame data from the second set of screen frame data that is different than the first set of screen frame data.

8. The method of claim 7, wherein transmitting the screen frame data only occurs when the difference between the first set of screen frame data and the second set exceeds a threshold value.

9. The method of claim 4, further comprising:

receiving an analog video signal from the local computer; and digitizing the analog video signal to produce the digitized video signal.

10. A device for establishing interaction between a local computer and a remote computer, comprising:

a user device input for a local mouse and a local keyboard;

a user device output in communication with the local computer;

a video input that receives video signals of the local computer, wherein the video input is directly interfaced to an external video output port of the local computer providing the video signals of the local computer such that the device is externally and rigidly connected to the local computer without the use of an external video cable for transferring video signals between the local computer and the device;

a frame grabber that grabs screen frames from the video signals to create screen frame data;

a video output configured to transmit the video signals of the local computer to a local display device;

a network interface device;

at least one processing device configured to provide signals from the local mouse and keyboard input to the local computer, to provide the video signals of the local computer to the video output, and to provide the screen frame data to the network interface device for distribution across a network, wherein the processing device establishes a web server having an IP address and provides the screen frame data from the web server upon receiving a request that is directed to the web server at the IP address through the network interface device; and a controller in communication with the at least one processing device and the user device input, the controller being configured to arbitrate between user device input from the network and user device input from the local mouse or local keyboard and provide user device input through the user device output to the local computer as each input occurs if the inputs are received alternately, and according to an assigned priority if the inputs are received simultaneously.

11. The device of claim 10, wherein the at least one processing device is further configured to compress the screen frame data prior to providing the screen frame data to the network interface device.

12. The device of claim 10, wherein the user device input is connected to a keyboard and a mouse.

13. The device of claim 10, further comprising a case housing the video input, the frame grabber, the network interface device, and the at least one processing device.

14. The device of claim 10, further comprising a USB controller and a USB output port in communication with a USB port of the local computer, and wherein the processing device controls the USB controller to emulate a storage device of the remote computer for use by the local computer.

15. The device of claim 10, further comprising a USB controller and a USB output port in communication with a USB port of the local computer, and wherein the processing device controls the USB controller to emulate a keyboard and a mouse.

16. The device of claim 10, further comprising XOR circuitry for comparing a first set of screen frame data to a second set of screen frame data to determine a difference between the first set of screen frame data and the second set, and wherein the processing device provides only the screen frame data that comprises the difference to the network interface.

17. The device of claim 16, wherein the processing device provides the screen frame data only when the difference between the first set of screen frame data and the second set exceeds a threshold value.

18. The device of claim 10, wherein upon the device being operably connected to receive the video input, the device is located other than within a rack.

19. The device of claim 10, wherein the video input is connected to a video output port of the local computer and the network interface device is connected to a network interface such that the device is in-line between the video output port and the network interface.

20. The device of claim 10, wherein upon the device being operably connected to receive the video input, the device is not permanently affixed where the device is located such that it is portable.

21. The device of claim 10, further comprising:

an output for mouse and keyboard signals being provided to the local computer;

a mouse connector on a printed circuit board within the device, wherein the mouse connector is electrically coupled to the input for the local mouse and the output to the local computer; and a keyboard connector on the printed circuit board within the device, wherein the keyboard connector is electrically coupled to the input for the local keyboard and the output to the local computer.

22. A device for establishing interaction between a local computer and a remote computer, comprising:
- a video input that receives video signals of the local computer, wherein the video input is directly interfaced to an external video output port of the local computer providing the video signals of the local computer such that the device is externally and rigidly connected to the local computer without the use of an external video cable for transferring video signals between the local computer and the device;
- a frame grabber that grabs screen frames related to the video signals to create screen frame data;
- a video output configured to transmit the video signals of the local computer to a local display device;
- a network interface device;
- at least one processing device configured to provide the video signals of the local computer to the video output, provide the screen frame data to the network interface device for distribution across a network, and receive user input data from the network, wherein the processing device establishes a web server having an IP address and provides the screen frame data from the web server upon receiving a request that is directed to the web server at the IP address through the network interface device;
- a user device input connected to at least one user device;
- a user device output in communication with the local computer; and
- a controller in communication with the at least one processing device and the user device input, the controller being configured to arbitrate between user device input from the network and user input from the at least one user device and provide user device input through the user device output to the local computer as each input occurs if the inputs are received alternately, and according to an assigned priority if the inputs are received simultaneously.

23. The device of claim 22, wherein the video signals of the local computer are analog, and wherein the device further comprises:
- an analog-to-digital converter that digitizes the analog video signals of the local computer to produce digitized video signals, and wherein the frame grabber grabs screen frames from the digitized video signals.

24. The device of claim 22, wherein the at least one processing device is further configured to compress the screen frame data prior to providing the screen frame data to the network interface device.

25. The device of claim 22, wherein the user device input is connected to a keyboard and a mouse.

26. The device of claim 22, further comprising a case housing the video input, the analog-to-digital converter, the frame grabber, the network interface device, and the at least one processing device.

27. The device of claim 22, further comprising a USB controller and a USB output port in communication with a USB port of the local computer, and wherein the processing device controls the USB controller to emulate a storage device of the remote computer for use by the local computer.

28. The device of claim 22, further comprising XOR circuitry for comparing a first set of screen frame data to a second set of screen frame data to determine a difference between the first set of screen frame data and the second set, and wherein the processing device provides only the screen frame data that comprises the difference to the network interface.

29. The device of claim 28, wherein the processing device provides the screen frame data only when the difference between the first set of screen frame data and the second set exceeds a threshold value.

30. The device of claim 22, wherein upon the device being operably connected to receive the video input, the device is located other than within a rack.

31. The device of claim 22, wherein the video input is connected to a video output port of the local computer and the network interface device is connected to a network interface such that the device is in-line between the video output port and the network interface.

32. The device of claim 22, wherein upon the device being operably connected to receive the video input, the device is not permanently affixed where the device is located such that it is portable.

33. A device for providing interaction with a local computer, comprising:
- an input for a local mouse and a local keyboard;
- an output for mouse and keyboard signals being provided from the local mouse and keyboard and from a remote mouse and keyboard to external mouse and keyboard inputs of the local computer;
- a controller configured to arbitrate between user input received from the remote mouse and keyboard and user input received from the local mouse and keyboard and provide input to the local computer as each input occurs if the inputs are received in succession, and according to an assigned priority if the inputs are received simultaneously;
- an input for video from the local computer, wherein the video input comprises a video input port directly interfaced to a video output port providing the video signals of the local computer such that the device is externally and rigidly connected to the local computer without the use of an external video cable for transferring video signals between the local computer and the device;
- a video output configured to transmit the video from the local computer to a local display;
- a frame grabber configured to grab screen frames from the video to create screen frame data;
- a network interface device configured to transmit the screen frame data across a network;
- a processing device configured to provide the video to the video output and to provide the screen frame data to the network interface device for distribution across the network, wherein the processing device establishes a web server having an IP address and provides the screen frame data from the web server upon receiving a request that is directed to the web server at the IP address through the network interface device; and
- wherein the local mouse and local keyboard input, the mouse and keyboard signal output, the controller, the video input, the video output, the frame grabber, the network interface device, and the processing device are configured on a plurality of stacked circuit boards.

* * * * *

UNITED STATES PATENT AND TRADEMARK OFFICE
CERTIFICATE OF CORRECTION

PATENT NO. : 7,260,624 B2 Page 1 of 1
APPLICATION NO. : 10/247876
DATED : August 21, 2007
INVENTOR(S) : Clas Gerhard Sivertsen It is certified that error appears in the above-identified patent and that said Letters Patent is hereby corrected as shown below:

<u>In the Claims</u>

Column 13, line 6, should read:
--...provided from upon receiving a <u>request</u> ~~recluest~~ that is directed...--

Signed and Sealed this

First Day of April, 2008

JON W. DUDAS
*Director of the United States Patent and Trademark Office*